United States Patent [19]
Krisher

[11] Patent Number: 5,941,335
[45] Date of Patent: Aug. 24, 1999

[54] INTEGRAL WHEEL END ASSEMBLY

[75] Inventor: James A. Krisher, Fort Wayne, Ind.

[73] Assignee: Dana Corporation, Toledo, Ohio

[21] Appl. No.: 08/937,843

[22] Filed: Aug. 25, 1997

Related U.S. Application Data

[63] Continuation of application No. 08/365,354, Dec. 28, 1994, abandoned.

[51] Int. Cl.$^6$ .................................................. B60G 3/00
[52] U.S. Cl. ........................ 180/255; 180/254; 180/258
[58] Field of Search .................................. 180/252, 253, 180/254, 256, 260, 255, 258

[56] References Cited

U.S. PATENT DOCUMENTS

| | | | |
|---|---|---|---|
| 3,028,924 | 4/1962 | Cooper | 180/73 |
| 4,275,799 | 6/1981 | Guimbretiere | 180/255 |
| 4,300,651 | 11/1981 | Krude | 180/256 |
| 4,359,128 | 11/1982 | Krude | 180/258 |
| 4,383,588 | 5/1983 | Krude | 180/70 R |
| 4,418,785 | 12/1983 | Ehrlinger | 180/255 |
| 4,442,914 | 4/1984 | Nishihara | 180/255 |
| 4,565,389 | 1/1986 | Kami et al. | 180/256 |
| 4,778,286 | 10/1988 | Kadokawa | 384/446 |
| 4,858,998 | 8/1989 | Welschof et al. | 301/124 R |
| 4,896,740 | 1/1990 | Hueckle et al. | 180/255 |
| 4,988,220 | 1/1991 | Christiansen et al. | 384/448 |
| 5,097,702 | 3/1992 | Nantua et al. | 73/118.1 |
| 5,143,458 | 9/1992 | Alff et al. | 384/448 |
| 5,209,580 | 5/1993 | Nakayama | 384/448 |
| 5,263,366 | 11/1993 | Sakamoto | 73/118.1 |

*Primary Examiner*—Anne Marie Boehler
*Attorney, Agent, or Firm*—Oldham & Oldham Co., L.P.A.

[57] ABSTRACT

The present invention relates to a wheel end assembly wherein the constant velocity universal joint, the spindle, and the wheel flange are combined into an integral unit that is easy to install and service. The wheel end assembly comprises a steering knuckle including a bore, and a CV joint having an inner race coupled for rotation with an axle shaft. The CV joint includes an integral spindle supported for rotation within the bore of the steering knuckle by removable bearing assemblies. A wheel mounting flange is also formed integrally with the spindle and allows piloting of a non-offset brake rotor thereto. The wheel end assembly is less complex, lighter weight, and less expensive to manufacture. The arrangement also allows easier service and preload adjustment of the bearing assemblies.

23 Claims, 1 Drawing Sheet

INTEGRAL WHEEL END ASSEMBLY

This application is continuation of application(s) Ser. No. 08/365,354 filed on Dec. 28, 1994, now abandoned

FIELD OF INVENTION

The present invention relates generally to a wheel end assembly, and more particularly to a wheel end assembly wherein the constant velocity universal joint, the spindle, and the wheel flange have been combined into an integral unit that is easy to install and service.

BACKGROUND OF THE INVENTION

A driving and steering axle of a vehicle typically includes an axle or shaft which originates from a differential at its inward end and connects to a constant velocity (CV) universal joint at its outward end. The CV joint includes an inner race which is connected for rotation with the axle shaft to receive torque therefrom. The CV joint further includes an outer race which receives torque from the inner race at a constant angular velocity through means such as torque transmitting balls. The outer race is typically coupled for rotation with a separate spindle which is, in turn, coupled for rotation with a wheel hub. The wheel hub is supported for rotation, by one or more bearing assemblies, within a bore formed through a steering knuckle. The wheel hub includes a wheel mounting flange formed in its outward regions to allow a wheel to be mounted to and secured for rotation with the wheel hub using a plurality of wheel mounting studs. A disk brake rotor is also usually secured adjacent to the wheel flange by the wheel mounting studs.

These prior wheel end assemblies include a variety of components which add to the complexity, the weight, and cost of the wheel end assembly. The multiple components and complexity of these prior wheel end assemblies also makes maintenance more difficult.

The configuration of these prior wheel end assemblies also requires that the brake rotor be offset. An offset brake rotor will have friction surfaces that do not lie substantially in the same vertical plane as the central region of the brake rotor. Offset brake rotors are heavier and usually require additional time to manufacture, thereby increasing cost. Also, offset brake rotors are thought to be more susceptible to lateral run-out or "warping" which can cause uneven braking, excessive brake shoe wear, and ineffective braking performance.

SUMMARY OF THE INVENTION

The present invention is therefore directed to a wheel end assembly comprising, a steering knuckle including a bore formed therethrough; a constant velocity universal joint having an inner race drivingly coupled for rotation with an axle shaft, an outer race drivingly coupled to the inner race, the constant velocity joint including an integral spindle supported for rotation within the bore of the steering knuckle by at least one bearing assembly; and, a wheel mounting flange formed integrally with the integral spindle and having mounting holes to accept a plurality of studs for mounting a wheel to said flange.

The present invention provides several advantages over prior wheel end assemblies such as being less complex, lighter weight, and less expensive to manufacture. The present invention also provides an arrangement allowing for easier service to the bearings and seals. Additionally, the present wheel end assembly allows for the use of a non-offset brake rotor which is cheaper, lighter, and less susceptible to lateral run-out as compared to a traditional offset brake rotor.

DETAILED DESCRIPTION OF THE INVENTION

Figure 1:
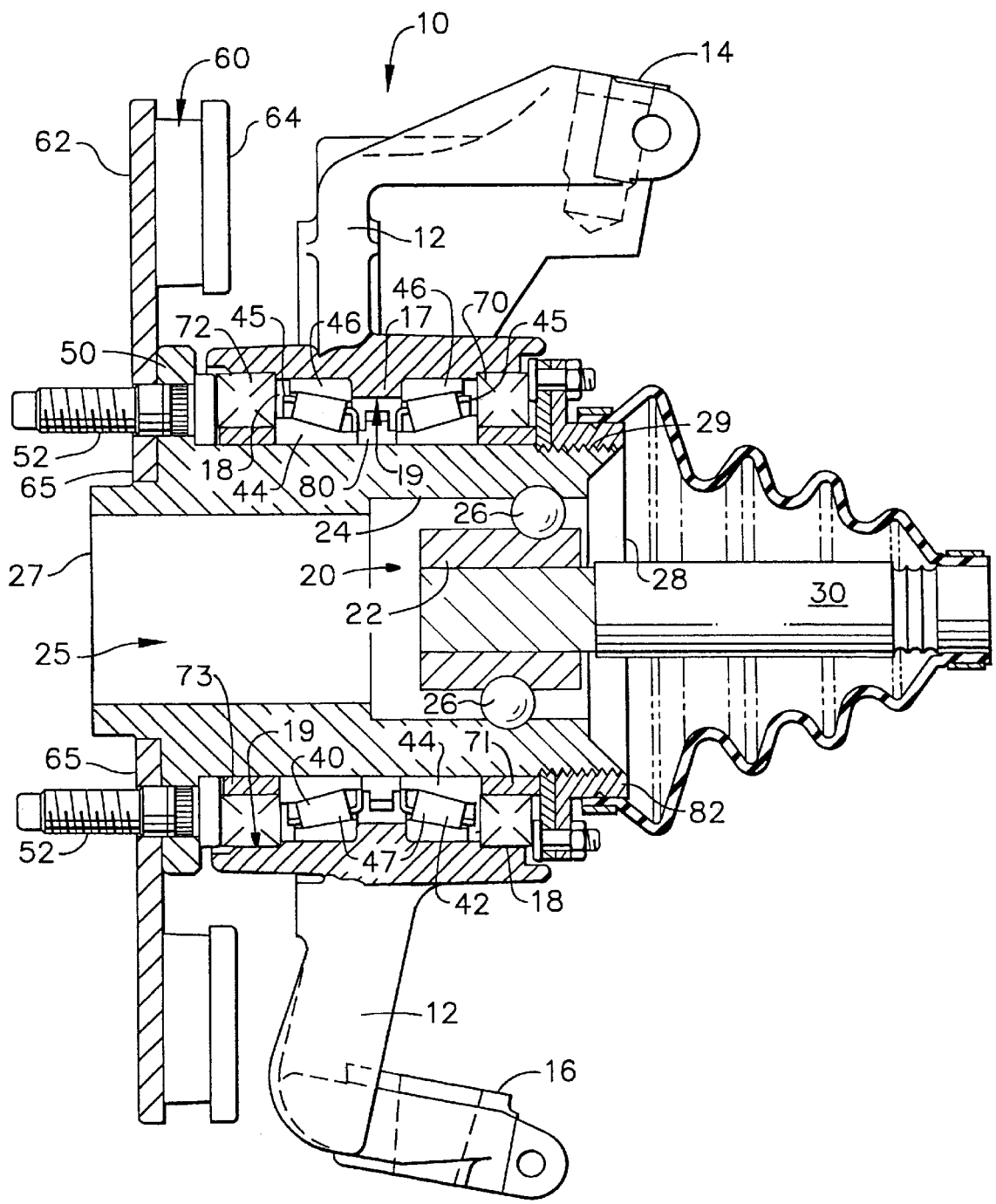
FIG. 1 is a sectional view of a preferred embodiment of the present invention.

Reference will now be made in detail to the preferred embodiment of the invention, an example of which is illustrated in FIG. 1, wherein the wheel end assembly of the present invention is shown generally at 10. Wheel end assembly 10 is designed for use on a driving and steering axle of a vehicle, and therefore, may typically be utilized in conjunction with a front axle of a front-wheel drive vehicle or in conjunction with a front axle of a four-wheel drive vehicle, although its use is not limited to such environments. A driving and steering axle normally includes differential located between the wheel end assemblies 10 for receiving torque from a transaxle or four-wheel drive transfer case and for transmitting torque to either or both wheel end assemblies 10 through a torque transferring axle shaft 30. The axle shaft 30 may also be housed within a non-rotating axle tube if desired.

The wheel end assembly 10 of the present invention includes a steering knuckle 12 having an upper mounting boss 14 and a lower mounting boss 16 allowing steering knuckle 12 to be attached to a vehicle chassis (not shown). The steering knuckle 12 also includes at least one bore 18 formed therethrough.

The wheel end assembly 10 further includes a constant velocity (CV) universal joint indicated generally at 20. CV joint 20 comprises an inner member or race 22 splined or otherwise drivingly coupled to axle shaft 30, an outer member or race 24 supported for rotation within bore 18 of steering knuckle 12 by first and second bearing assemblies 40, 42. The outer race 24 is formed integrally to also function as the wheel spindle 25, thereby eliminating the need for a separate spindle to be assembled with the CV joint 20 to receive driving torque therefrom. Circumferentially spaced torque transmitting balls 26 (only two shown) are disposed between inner race 22 and outer race 24. Each ball 26 is received within one of a plurality of grooves formed in outer race 24 and a cooperating and corresponding one of a plurality of grooves formed in inner race 22 so as to be capable of transmitting torque from inner race 22 to outer race 24. Balls 26 and grooves cooperate such that torque is transmitted from inner race 22 to outer race 24 at a constant angular velocity throughout the range of steering motion of wheel end assembly 10. Balls 26 are typically retained within grooves in outer race 24 and corresponding grooves in inner race 22 by a cage member. Other arrangements for providing a constant velocity universal joint coupling of inner race to outer race 24 are known, and the invention is not meant to be limited to any particular means for providing a constant angular velocity coupling 20 between inner race 22 and outer race 24.

CV joint 20, and more particularly the outer race 24 thereof is supported for rotation within bore 18 of steering knuckle by a first bearing assembly 40 and a second bearing assembly 42. An inner seal 70 and an outer seal 72 are provided to substantially prevent dirt, water, or other foreign substances from entering bore 18 and first and second bearing assemblies 40, 42. First and second bearing assemblies 40, 42 each have an inner race 44, an outer race 46, and retainer or cage 45 for evenly circumferentially spacing the bearings about the inner bearing race 44. Inner races 44 of bearing assemblies may be separate members positioned on the outer surface of spindle 25. Likewise, outer bearing races 46 may be separate members positioned in association with inner surface 19 of bore 18 of steering knuckle 12. Preferably, bearing assemblies 40, 42 are unitary bearing assemblies that are piloted on the outer diameter of the outer race 24 of CV joint 20. Bearings 47 are shown as the preferable tapered roller bearings, although the invention is not meant to be limited to this or any other type of particular bearing assembly. For example, ball bearings may be utilized in place of tapered roller bearings 47. In this manner, during assembly or disassembly of the wheel end 10, bearing assemblies 40, 42 may simply be piloted on or removed from their position about the outer diameter of the outer race 24 of CV joint 20. If either or both bearing assemblies 40, 42 need replacement, the entire bearing assembly 40, 42 may be removed from its position about CV joint 20, discarded, and replaced by a similar relatively low-cost bearing assembly. In this manner, bearing assemblies 40, 42 may be easily replaced and/or serviced. Further, by forming bearing races separate from outer surface 25 of outer race 24 of CV joint 20 and separate from inner surface 19 of bore 18, these surfaces 25, 19 need not be formed of expensive, high quality bearing grade steel. Also, bearing assemblies 40, 42 may be replaced without replacing outer race 24 of CV joint or knuckle 12.

Bore 18 preferably includes a centralized shoulder 17 to assist in the proper positioning of first and second bearings 40, 42 and to prevent axial movement of bearing assemblies 40, 42. A tone ring 80 is preferably piloted on the outer diameter of the outer race 24 of CV joint 20 and is preferably located between first bearing assembly 40 and second bearing assembly 42 to coact with a sensor (not shown) to provide input signals for an anti-lock braking system, traction control system, or a similar system requiring wheel speed measurement. An inner wear sleeve 71 and an outer wear sleeve 73 are also provided about the outer diameter of the outer race 24 of CV joint 20 to assist in positioning the spindle 25 relative to shoulder 17. Shoulder 17 and inner and outer wear sleeves 71, 73 coact to prevent axial movement of the spindle 25 during axial loading.

Outer race 24 of constant velocity joint 20 includes a wheel mounting flange 50 formed integrally therewith. Flange 50 preferably includes a plurality of holes formed therethrough to receive a plurality of wheel mounting studs 52 to allow a wheel and a tire to be secured for rotation with the integral wheel flange 50. Providing the wheel mounting flange 50 as an integral part of the CV joint 20 provides an arrangement which allows for simple wheel stud installation, while eliminating a separate component and reducing costs of manufacture and assembly. The integral wheel flange 50 formed as part of the CV joint 20 in spindle 25 also provides for mounting of a brake rotor 60 positioned adjacent to the outer end of the CV joint 20, integral spindle 25 and the integral wheel flange 50 for convenient assembly. The brake rotor 60 includes a central aperture which is piloted on the outer end 27 of outer race 24 of CV joint 20 integral with spindle 25. Brake rotor 60 is secured for rotation with wheel flange 50 by wheel mounting studs 52 which pass through apertures formed through brake rotor 60, such that rotation of the rotor 60 is restrained to rotate with flange 50 by the wheel studs 52.

The positioning of brake rotor 60 is preferably non-offset relative to the mounting flange 50 to provide a brake rotor 60 which requires less material to manufacture, is lightweight, easy to manufacture, and less susceptible to lateral run-out as compared to a conventional offset brake rotor. The friction surfaces 62, 64 of the non-offset brake rotor 60 therefore lie in substantially the same vertical plane as the central region 65 of brake rotor 60 which is piloted on the outer end of the integral CV joint 20, spindle 25 and flange 50, and in substantially the same plane as wheel flange 50.

In the configuration of the wheel end assembly in accordance with the invention, the bearing assemblies 40 and 42, preferably being separate in unitary bearing assemblies, are easily positioned in association with the integral CV joint 20, spindle 25 and flange 50 in association with the steering knuckle 12. Thus, the two bearing assemblies 40 and 42 are mounted in association with the knuckle 12 along with the seals 70 and 72 and the corresponding seal wear sleeves 71 and 73 as previously indicated. The bearing assemblies 40 and 42 are then preloaded for proper functioning in the wheel end assembly. In this regard, the outer member 24 of CV joint 20 includes external threads 29 at its inner end 28 to receive a locknut 82 which may be utilized to preload the bearings 40, 42 through force applied to wear sleeves 71, 73. Locknut 82 and coacting threads 29 provide an effective means for easily adjusting the preload of the bearing assemblies 40, 42. This allows the preload of bearings to be properly adjusted upon initial installation of the wheel end assembly 10 on a vehicle, and provides a simple means for adjusting the preload of bearing assemblies 40, 42 during routine maintenance operations to account for an wear that may have occurred through use of the vehicle.

The integral CV joint 20, spindle 25 and wheel flange 50 provide a fixed joint design having the exterior portion thereof providing an outside diameter which is easily machined to pilot the bearing cone bores for accommodating the inner bearing races 44 of each of the bearing assemblies 40 and 42. The outer diameter also provides an easily machined surface for providing threads at the inner end for mounting of the locknut 82 for simple preloading of the bearing assemblies 40 and 42. The integral flange 50 formed at the outer portion of the outer diameter simplifies wheel stud installation and allows machining of the outer end to pilot the brake rotor and wheel assembly for simplified manufacture and assembly steps. In this arrangement the wheel end assembly 10 may be easily disassembled for cleaning and regreasing of first and second bearing assemblies 40, 42 as required. Similarly, providing bearing assemblies 40 and 42 as removable assemblies allows the bearing assemblies to be easily removed and replaced without replacing any part of the integral CV joint 20, spindle 25 and flange 50. As previously mentioned, providing removable bearing assemblies 40 and 42 in the wheel end assembly 10 also allows the integral CV joint 20, spindle 25 and flange 50 to be more cost effectively manufactured, as there is no need to form these components of expensive, high quality bearing grade steel with use of the removable bearing assemblies 40 and 42.

In operation, shaft 30 receives torque from a differential (not shown). Inner race 22 of constant velocity joint 20 receives torque from shaft 30, through a splined connection or otherwise, and transmits torque through balls 26 to outer race 24 of CV joint and the integral spindle 25. Outer race 24 of CV joint 20 and spindle 25 transmits torque to wheel flange 50 which is formed integrally therewith. Wheel flange 50 transmits torque to wheel mounting studs 52 to drive a wheel and tire, and to couple brake rotor 60 for rotation with wheel flange 50.

While the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A wheel end assembly for a driving and steering axle of a motor vehicle, comprising:

a steering knuckle including a bore formed therethrough;

a constant velocity universal joint having an inner race drivingly coupled for rotation with an axle shaft to receive torque therefrom, and an outer race drivingly coupled to said inner race, said constant velocity joint including an integral spindle supported for rotation within said bore of said steering knuckle by at least one removable bearing assembly; and a wheel mounting flange formed integrally as a single piece with said integral spindle and having mounting holes to accept a plurality of studs for mounting a wheel to said wheel mounting flange.

2. A wheel end assembly as recited in claim 1, wherein, said integral spindle includes an outer diameter, and wherein said at least one removable bearing assembly comprises first and second roller bearing assemblies, said first and second roller bearing assemblies piloted on said outer diameter of said integral spindle to support said spindle for rotation within said bore of said steering knuckle.

3. A wheel end assembly as recited in claim 2, wherein, said first and second roller bearing assemblies are tapered roller bearing assemblies.

4. A wheel end assembly as recited in claim 2, wherein, said first and second roller bearing assemblies are ball bearing assemblies.

5. A wheel end assembly as recited in claim 1, further comprising a bearing preload adjusting mechanism movably positioned relative to said integral spindle to apply a preloading force on said at least one removable bearing assembly.

6. A wheel end assembly as recited in claim 5, wherein, said bearing preload adjusting mechanism comprises a locknut and said integral spindle has an inner end including external threads to accept said locknut, with said locknut capable of being threaded onto said external threads of said spindle to apply a predetermined preloading force onto said at least one removable bearing assembly.

7. A wheel end assembly as recited in claim 1, further comprising a brake rotor, wherein, said integral spindle includes an outer end including a portion integral therewith for piloting said brake rotor thereupon, said brake rotor having an inner diameter piloted on said portion of said outer end of said integral spindle.

8. A wheel end assembly as recited in claim 7, wherein said brake rotor is in substantially the same plane as said wheel mounting flange, and said portion of said outer end of said integral spindle is positioned relative to said wheel mounting flange such that said brake rotor is positioned substantially coplanar with said wheel mounting flange.

9. A wheel end assembly as recited in claim 1, further comprising a tone ring piloted on said outer diameter of said integral spindle.

10. A wheel end assembly as recited in claim 2, further comprising a tone ring piloted on said outer diameter of said integral spindle between said first and second removable bearing assemblies.

11. A wheel end assembly as recited in claim 1, further comprising at least one wear sleeve piloted on said outer diameter of said integral spindle.

12. A wheel end assembly as recited in claim 2, further comprising inner and outer wear sleeves piloted on said outer diameter of said integral spindle such that said first and second roller bearing assemblies are located between said inner and outer wear sleeves.

13. A wheel end assembly as recited in claim 1, further comprising at least one seal disposed about said outer diameter of said integral spindle for preventing the passage of at least dirt and water into said bore of said steering knuckle adjacent to said at least one bearing assembly.

14. A wheel end assembly as recited in claim 12, further comprising inner and outer seals to coact with said inner and outer wear sleeves, respectively, to prevent the passage of at least dirt and water into said bore of said steering knuckle adjacent to said first and second removable bearing assemblies.

15. A wheel end assembly as recited in claim 1, wherein said inner race of said constant velocity universal joint is drivingly coupled to said outer race of said constant velocity universal joint by a plurality of torque transmitting balls spaced circumferentially around said inner race, said plurality of torque transmitting balls positioned between and engaged with both said inner and outer races.

16. A wheel end assembly as recited in claim 15, wherein said plurality of circumferentially spaced torque transmitting balls are maintained in position by a retaining cage member.

17. A wheel end assembly as recited in claim 1, wherein said constant velocity universal joint is a fixed joint design.

18. A wheel end assembly for an axle of a motor vehicle, comprising:

a steering knuckle having a bore formed therethrough;

a constant velocity universal joint having an inner race drivingly coupled for rotation with an axle shaft to receive torque therefrom and an outer race drivingly coupled to said inner race, said constant velocity universal joint having a spindle supported for rotation within said bore of said steering knuckle by a first removable bearing assembly and a second removable bearing assembly; and a wheel mounting flange formed integrally as a single piece with said integral spindle and having mounting holes to accept a plurality of studs for mounting a wheel to said wheel mounting flange.

19. The wheel end assembly in accordance with claim 18, wherein said spindle is integral with said outer race of constant velocity universal joint.

20. The wheel end assembly in accordance with claim 18, further including a brake rotor which is in substantially the same plane as said wheel mounting flange and said spindle includes an outer end having an integral portion for piloting said brake rotor thereon, said brake rotor having an inner diameter piloted on said portion of said outer end of said spindle and said portion of said outer end of said spindle is positioned relative to said wheel mounting flange such that said brake rotor is positioned substantially coplanar with said wheel mounting flange.

21. The wheel end assembly in accordance with claim 18, wherein said steering knuckle has an upper mounting boss and a lower mounting boss and an axis extending therebetween and said constant velocity universal joint is positioned substantially in line with said axis extending between said upper mounting boss and said lower mounting boss of said steering knuckle.

22. A wheel end assembly for an axle of a motor vehicle, comprising:

a suspension member having a bore formed therethrough;

a constant velocity universal joint having an inner race drivingly coupled for rotation with an axle shaft to receive torque therefrom and an outer race drivingly coupled to said inner race, said constant velocity universal joint having an integral spindle supported for rotation within said bore of said suspension member by at least one removable bearing assembly; and a wheel mounting flange formed integrally as a single piece with said integral spindle and having mounting holes to accept a plurality of studs for mounting a wheel to said wheel mounting flange.

23. The wheel end assembly in accordance with claim 22, further including a brake rotor which is in substantially the same plane as said wheel mounting flange and said integral spindle includes an outer end having an integral portion for piloting said brake rotor thereon, said brake rotor having an inner diameter piloted on said portion of said outer end of said integral spindle and said portion of said outer end of said integral spindle is positioned relative to said wheel mounting flange such that said brake rotor is positioned substantially coplanar with said wheel mounting flange.

* * * * *